US012802447B2

(12) United States Patent
Sanghvi

(10) Patent No.: US 12,802,447 B2
(45) Date of Patent: Nov. 17, 2026

(54) SELF-SERVICE KIOSK TAMPERING DETECTION BASED ON AUGMENTED REALITY

(71) Applicant: Bank of America Corporation, Charlotte, NC (US)

(72) Inventor: Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 424 days.

(21) Appl. No.: 18/200,061

(22) Filed: May 22, 2023

(65) Prior Publication Data

US 2024/0395044 A1 Nov. 28, 2024

(51) Int. Cl.

| | |
|---|---|
| ***G06V 20/50*** | (2022.01) |
| ***G06Q 20/18*** | (2012.01) |
| ***G06Q 20/20*** | (2012.01) |
| ***G06T 7/00*** | (2017.01) |
| ***G06T 7/70*** | (2017.01) |
| ***G06V 20/20*** | (2022.01) |

(52) U.S. Cl.

CPC ............. *G06V 20/50* (2022.01); *G06Q 20/18* (2013.01); *G06Q 20/206* (2013.01); *G06T 7/0002* (2013.01); *G06T 7/70* (2017.01); *G06V 20/20* (2022.01)

(58) Field of Classification Search

CPC ........ G06V 20/50; G06V 20/20; G06Q 20/18; G06Q 20/206; G06T 7/0002; G06T 7/70; G07F 9/023; G07F 19/20; G07F 19/2055; G07F 19/206; G07F 19/207

See application file for complete search history.

(56) References Cited

U.S. PATENT DOCUMENTS

| | | | | |
|---|---|---|---|---|
| 7,995,791 | B2 | 8/2011 | Flook et al. | |
| 10,121,331 | B1 | 11/2018 | Hodges et al. | |
| 10,311,646 | B1 | 6/2019 | Wurmfeld et al. | |
| 10,331,874 | B1 | 6/2019 | Benkreira et al. | |
| 10,936,928 | B2 | 3/2021 | Scaife et al. | |
| 11,037,391 | B1 * | 6/2021 | Alexander | G07F 19/202 |
| 11,049,370 | B2 | 6/2021 | Hodges | |
| 11,276,279 | B1 * | 3/2022 | Hamchuck | G07F 19/209 |
| 2017/0054735 | A1 * | 2/2017 | Moretti | G06F 3/14 |
| 2019/0108734 | A1 * | 4/2019 | Cook | H04N 7/188 |

* cited by examiner

*Primary Examiner* — Matthew C Bella

(74) *Attorney, Agent, or Firm* — Banner & Witcoff, Ltd.

(57) ABSTRACT

Arrangements for tampering detection at a self-service kiosk based on augmented reality are provided. In some aspects, a computing platform may receive image data from an augmented reality computing device. The image data may include images of a self-service kiosk located proximal to the augmented reality computing device. The image data may be analyzed to identify an identifier of the self-service kiosk. The identifier may be used to retrieve pre-stored physical specification data of the self-service kiosk. In some examples, the image data may be further analyzed to determine current physical specifications of the self-service kiosk. The current specifications may be compared to the pre-stored specifications to determine whether an anomaly exists. If an anomaly exists, a mitigating action may be generated and sent to the self-service kiosk for execution. If an anomaly is not identified, a notification may be generated and transmitted to the augmented reality computing device.

20 Claims, 10 Drawing Sheets

SELF-SERVICE KIOSK TAMPERING DETECTION BASED ON AUGMENTED REALITY

BACKGROUND

Aspects of the disclosure relate to electrical computers, systems, and devices for detecting tampering at a self-service kiosk based on augmented reality.

As unauthorized actors become more sophisticated, it is important for users to ensure safety and security of their personal information, data, and the like. Unauthorized users often use skimming devices attached to a card reader, keypad, or the like, at a self-service kiosk to obtain user payment or other information without user permission. These skimming devices can be difficult for a user to identify based on appearance. Accordingly, aspects described herein use augmented reality to provide real-time or near real-time determination of whether tampering has occurred at a self-service kiosk.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with detecting tampering at a self-service kiosk.

In some aspects, a computing platform may receive image data from an augmented reality computing device. The image data may include images (e.g., still images, video streams, or the like) of a self-service kiosk located proximal to the augmented reality computing device. The image data may be analyzed to identify an identifier of the self-service kiosk (e.g., make, model, or the like). The identifier may then be used to retrieve pre-stored physical specification data of the self-service kiosk (e.g., overall dimensions, and the like).

In some examples, the image data may be further analyzed to determine current physical specifications of the self-service kiosk (e.g., based on the images). The current physical specifications may be compared to the pre-stored physical specifications to determine whether an anomaly exists. If an anomaly exists, a mitigating action may be generated or identified and sent to the self-service kiosk for execution.

If an anomaly is not identified, a notification may be generated and transmitted to the augmented reality computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, unauthorized actors are becoming more sophisticated and aggressive in techniques to acquire user information. The use of card skimmers (e.g., a device connected to or installed on a card reader to capture user card numbers that may later be used by unauthorized users), keypad skimmers (e.g., a device connected to or installed on a key pad to capture user input such as personal identification number that may later be used by unauthorized users), and the like, can be difficult for users to detect during the course of a transaction. Accordingly, aspects described herein use augmented reality to evaluate self-service kiosks to identify tampering.

For instance, if a card skimmer or keypad skimmer is attached to a self-service kiosk, it will alter the physical specifications of the self-service kiosk (e.g., a card skimmer may protrude outward from a surface of the self-service kiosk more than the actual card reader, a keypad skimmer may modify a depth of the keypad from the surface of the self-service kiosk, and the like). Accordingly, as discussed more fully herein, current physical specifications of a self-service kiosk may be captured using an augmented reality device and compared to pre-stored, expected physical specifications of the self-service kiosk (e.g., as received from the manufacturer, as determined prior to commissioning, or the like). If an anomaly is identified, mitigating actions may be identified and executed to mitigate risk associated with the skimming devices.

These and various other arrangements will be discussed more fully below.

Figure 1A:
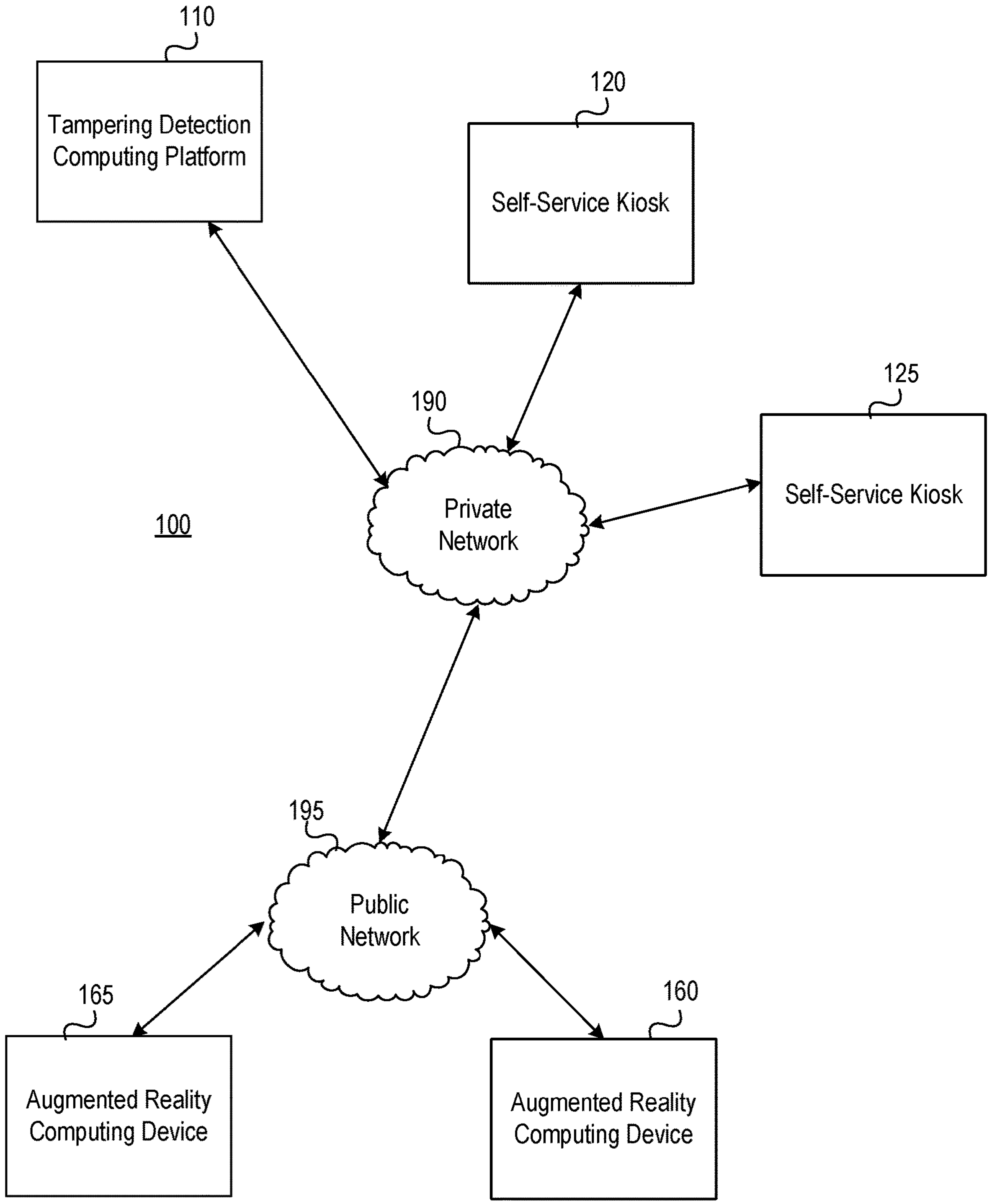
FIGS. 1A-1B depict an illustrative computing environment for implementing self-service kiosk tampering detection based on augmented reality in accordance with one or more aspects described herein.
Figure 1B:
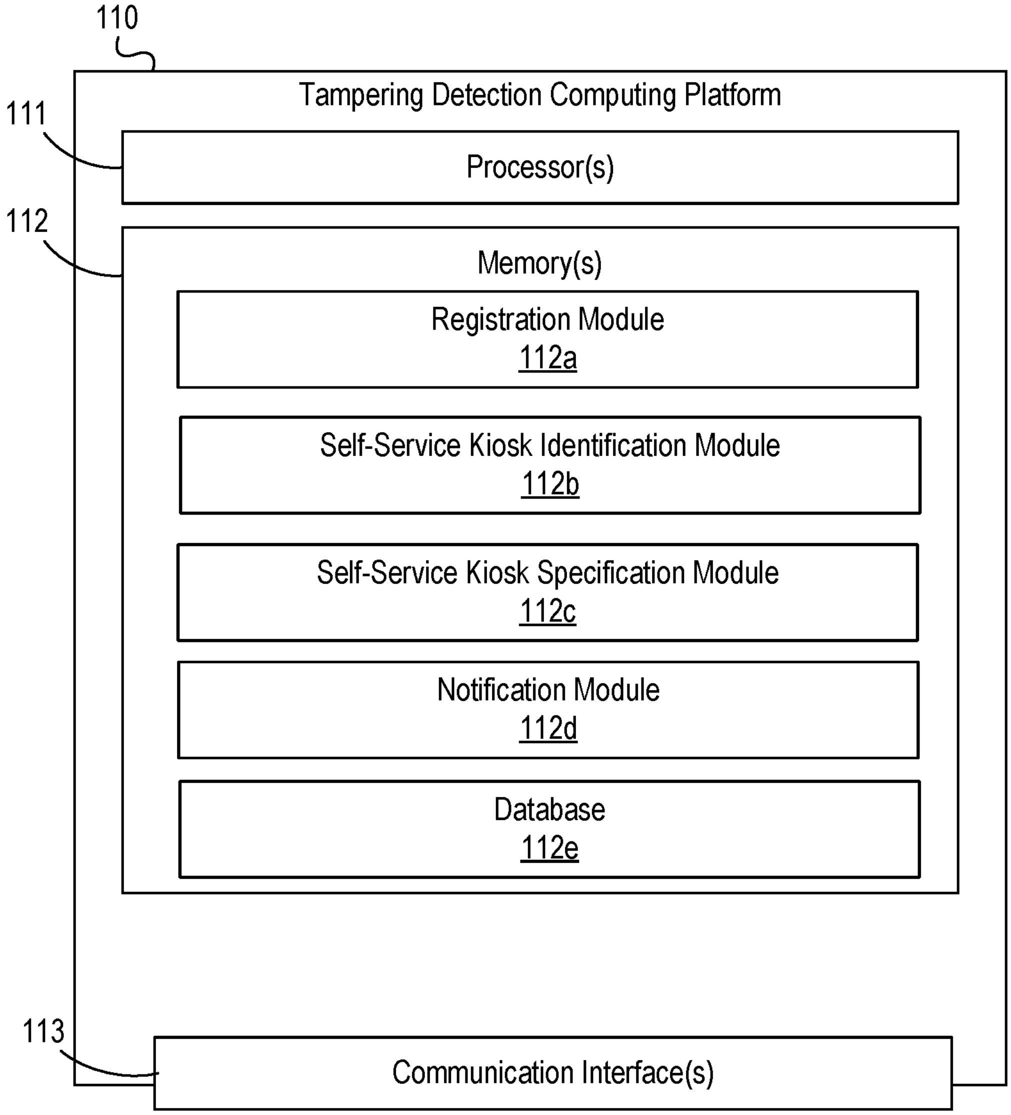

Aspects described herein may be implemented using one or more computing devices operating in a computing environment. For instance, FIGS. 1A-1B depict an illustrative computing environment for implementing self-service kiosk tampering detection based on augmented reality in accordance with one or more aspects described herein. Referring to FIG. 1A, computing environment 100 may include one or more computing devices and/or other computing systems. For example, computing environment 100 may include tampering detection computing platform 110, self-service kiosk 120, self-service kiosk 125, augmented reality computing device 160, and/or augmented reality computing device 165. Although two self-service kiosks 120, 125 and two augmented reality computing devices 160, 165 are shown, any number of systems or devices may be used without departing from the invention.

Tampering detection computing platform 110 may be or include one or more computing devices (e.g., servers, server blades, or the like) and/or one or more computing components (e.g., memory, processor, and the like) and may be configured to provide dynamic, efficient tampering detection for self-service kiosks. In some examples, tampering detection functions described herein may be performed in real-time or near real-time. Further, while tampering detection computing platform 110 is shown as a separate device in FIG. 1A, tampering detection computing platform 110 may be part of (e.g., same physical device as) one or more of augmented reality computing device 160 and/or augmented reality computing device 165.

Tampering detection computing platform 110 may be configured to receive image data (e.g., still images, video streams, or the like) of a self-service kiosk 120 and captured using augmented reality computing device 160 and/or augmented reality computing device 165. In some examples, the image data may include a scan of a machine-readable code (e.g., quick response (QR) code, bar code, or the like) visible on the self-service kiosk 120. Based on the image data, tampering detection computing platform 110 may identify a make, model, or the like, of the self-service kiosk 120 (e.g., based on branding data visible in the image data, based on location of the self-service kiosk 120 as determined from global positioning system (GPS) data from the augmented reality computing device 160, 165, or the like). In some examples, the make, model or the like may be determined from the scanned machine-readable code data.

Tampering detection computing platform 110 may retrieve (e.g., from a database) specifications of the self-service kiosk 120. For instance, tampering detection computing platform 110 may retrieve physical specifications associated with size, shape, position of a deposit slot, position of a card reader slot, position of a keypad, depth of keypad from a surface of the self-service kiosk, and the like may be retrieved from the database. Tampering detection computing platform 110 may use one or more image analysis tools (e.g., optical character recognition, object recognition, and the like) to determine corresponding specifications of the self-service kiosk 120 as shown in the image data. Tampering detection computing platform 110 may then compare the determined specifications to the retrieved specifications and, if an anomaly is detected, may identify and execute one or more mitigating actions.

Self-service kiosk 120 and/or self-service kiosk 125 may be or include one or more computing devices (e.g., servers, server blades, or the like) and/or one or more computing components (e.g., memory, processor, and the like) and may be configured to receive and process transaction requests (e.g., cash withdrawals, balance transfers, deposits, or the like). Self-service kiosk 120 and/or self-service kiosk 125 may include automated teller machines (ATMs), automated teller assistants (ATAs), self-service point-of-sale systems, or the like. Self-service kiosk 120 and/or self-service kiosk 125 may be configured to display one or more user interfaces, each user interface including a plurality of selectable options associated with various functionality of the self-service kiosk 120, 125. In some examples, self-service kiosk 120 and/or self-service kiosk 125 may include short-range wireless communication capabilities, such as near field communication, Bluetooth LE, and the like. Self-service kiosk 120 and/or self-service kiosk 125 may be configured to connect (e.g., via a short-range wireless communication protocol) to augmented reality computing device 160 and/or augmented reality computing device 165 when one or more of augmented reality computing device 160 and/or augmented reality computing device is within a predetermined distance or range from the self-service kiosk 120 and/or self-service kiosk 125, to enable communication between self-service kiosk 120 and/or self-service kiosk 120 and augmented reality computing device 160 and/or augmented reality computing device 165.

Augmented reality computing device 160 and/or augmented reality computing device 165 may be or include one or more mobile computing devices, such as a smart phone or other smart device, wearable device (e.g., augmented reality glasses or the like), laptop computer, tablet computer, or the like. Augmented reality computing device 160 and/or augmented reality computing device 165 may receive (e.g., via download) an augmented reality application and execute the augmented reality application. Augmented reality computing device 160 and/or augmented reality computing device 165 may include a display (e.g., eye covering portion of augmented reality glasses, display of a smart phone, or the like) configured to display augmented reality images of the self-service kiosk 120, 125 in order to identify any anomalies in the specifications (e.g., physical specifications) of the self-service kiosk 120, 125. Augmented reality computing device 160 and/or augmented reality computing device 165 may also include an image capture device (e.g., camera, or the like) configured to capture image data (e.g., still images, video streams, or the like) of self-service kiosk 120, 125 that may be used to identify current specifications of the self-service kiosk 120, 125 for comparison to retrieved or expected specifications.

As mentioned above, computing environment 100 also may include one or more networks, which may interconnect one or more of tampering detection computing platform 110, self-service kiosk 120, self-service kiosk 125, augmented reality computing device 160 and/or augmented reality computing device 165. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, tampering detection computing platform 110, self-service kiosk 120, and/or self-service kiosk 125, may be associated with an enterprise organization (e.g., a financial institution), and private network 190 may be associated with and/or operated by the organization, and may include one or more networks (e.g., LANs, WANs, virtual private networks (VPNs), or the like) that interconnect tampering detection computing platform 110, self-service kiosk 120, and/or self-service kiosk 125, and one or more other computing devices and/or computer systems that are used by, operated by, and/or otherwise associated with the organization. Public network 195 may connect private network 190 and/or one or more computing devices connected thereto (e.g., tampering detection computing platform 110, self-service kiosk 120, and/or self-service kiosk 125) with one or more networks and/or computing devices that are not associated with the organization. For example, augmented reality computing device 160 and/or augmented reality computing device 165 might not be associated with an organization that operates private network 190 (e.g., because augmented reality computing device 160 and/or augmented reality computing device 165 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect augmented reality computing device 160 and/or augmented reality computing device 165 to private network 190 and/or one or more computing devices connected thereto (e.g., tampering detection computing platform 110, self-service kiosk 120, and/or self-service kiosk 125).

Referring to FIG. 1B, tampering detection computing platform 110 may include one or more processors 111, memory 112, and communication interface 113. A data bus may interconnect processor(s) 111, memory 112, and communication interface 113. Communication interface 113 may be a network interface configured to support communication between tampering detection computing platform 110 and one or more networks (e.g., network 190, network 195, or the like). Memory 112 may include one or more program modules having instructions that when executed by processor(s) 111 cause tampering detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of tampering detection computing platform 110 and/or by different computing devices that may form and/or otherwise make up tampering detection computing platform 110.

For example, memory 112 may have, store and/or include registration module 112*a*. Registration module 112*a* may store instructions and/or data that may cause or enable the tampering detection computing platform 110 to receive a user request to register a device (e.g., augmented reality computing device 160, augmented reality computing device 165, or the like). The request may include device identifying data, user identifying data, and the like. The registration data may be stored in database 112*e*. In some examples, registering the device or user may cause an augmented reality application to be downloaded to the device (e.g., if the application or other augmented reality capabilities are not available on the device).

Tampering detection computing platform 110 may further have, store and/or include self-service kiosk identification module 112*b*. Self-service kiosk identification module 112*b* may store instructions and/or data that may cause or enable the tampering detection computing platform 110 to receive image data, machine-readable code data, or the like, and identify, based on the received data, a make, model, serial number, or the like, of the self-service kiosk being imaged. In some examples, optical character recognition, or the like, may be used to identify the self-service kiosk being imaged.

Tampering detection computing platform 110 may further have, store and/or include self-service kiosk specification module 112*c*. Self-service kiosk specification module 112*c* may store instructions and/or data that may cause or enable the tampering detection computing platform 110 to analyze received image data to identify one or more physical specifications associated with the self-service kiosk being imaged. For instance, self-service kiosk specification module 112*c* may analyze the received images (e.g., still images, video streams, or the like) to determine (e.g., using object recognition or other image analysis techniques) physical specifications of the self-service kiosk being imaged (e.g., an overall side, a depth of a card reader slot, a depth of a keypad from a surface of the self-service kiosk, or the like). Self-service kiosk specification module 112*c* may also store instructions to retrieve, from database 112*e*, pre-stored or expected specifications for the identified self-service kiosk make, model, or the like. Self-service kiosk specification module 112*c* may compare the retrieved specifications with the determined specifications to identify any anomalies.

Tampering detection computing platform 110 may further have, store and/or include notification module 112*d*. Notification module 112*d* may store instructions and/or data that may cause or enable the tampering detection computing platform 110 to generate one or more notifications based on whether any anomalies were detected between the retrieved specification data and the determined specification data. For instance, notification module 112*d* may generate a notification identifying any anomalies detected, transmit the notification to the self-service kiosk and/or the augmented reality computing device, and the like. In some examples, the notification may include instructions causing modification to an augmented reality image displayed on the augmented reality computing device to display where the anomaly was detected.

Tampering detection computing platform 110 may further have, store and/or include database 112*e*. Database 112*e* may store specification data, such as physical specification data, for a plurality of makes, models, and the like, of self-service kiosks, as well as other data that enables performance of the aspects described herein by the tampering detection database.

FIGS. 2A-2D depict one example illustrative event sequence for implementing tampering detection processes based on augmented reality in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
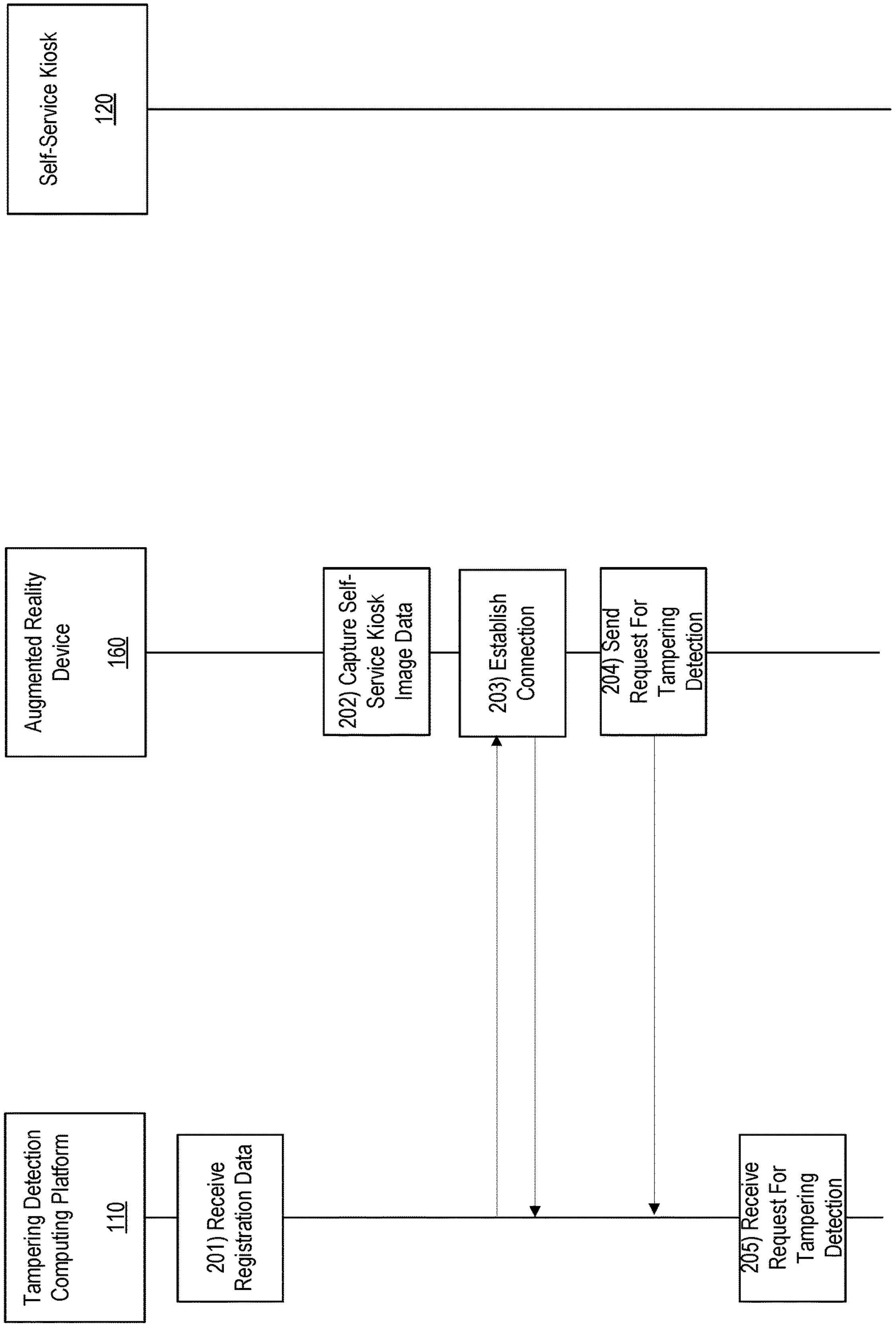
FIGS. 2A-2D depict an illustrative event sequence for implementing self-service kiosk tampering detection based on augmented reality in accordance with one or more aspects described herein.

With reference to FIG. 2A, at step 201, tampering detection computing platform 110 may receive registration data. For instance, one or more users may register one or more augmented reality devices, such as augmented reality computing device 160 and/or augmented reality computing device 165 with the tampering detection computing platform 110. In some examples, the registration data may include user identifiers, device identifiers, and the like. In some examples, self-service kiosks may also be registered with the tampering detection computing platform 110. For instance, make, model, location, and the like, may be provided during a registration process with the tampering detection computing platform 110 for enterprise organizations desiring to be registered or from self-service kiosks associated with the enterprise organization implementing the tampering detection computing platform 110. In some examples, physical specification data may be provided during the registration process of one or more self-service kiosks.

At step 202, an augmented reality device, such as augmented reality computing device 160, may capture image data of a self-service kiosk 120. In some examples, augmented reality computing device 160 may capture one or more still images, video streams, and the like, of the self-service kiosk 120, or portions thereof. For instance, augmented reality computing device 160 may capture images of the overall self-service kiosk, of portions of the self-service kiosk prone to tampering such as a card reader slot (e.g., where a skimmer may be attached), keypad (e.g., where a keypad skimming device may be attached) or the like.

At step 203, augmented reality computing device 160 may establish a connection with the tampering detection computing platform 110. For instance, a first wireless connection may be established between the augmented reality computing device 160 and the tampering detection computing platform 110. Upon establishing the first wireless connection, a communication session may be initiated between augmented reality computing device 160 and the tampering detection computing platform 110.

At step 204, augmented reality computing device 160 may transmit or send a request for tampering detection to the tampering detection computing platform 110. For instance, augmented reality computing device 160 may transmit or send the captured image data with a request to evaluate the self-service kiosk 120 for tampering. In some examples, the request for tampering detection may include data captured from a machine-readable code provided on the self-service kiosk 120 that may include identifying information for the self-service kiosk 120 (e.g., make, model, or the like) and/or specification data for the self-service kiosk 120. In some examples, the request may be sent during the communication session initiated upon establishing the first wireless connection.

At step 205, tampering detection computing platform 110 may receive the request for tampering detection and may process the request.

Figure 2B:
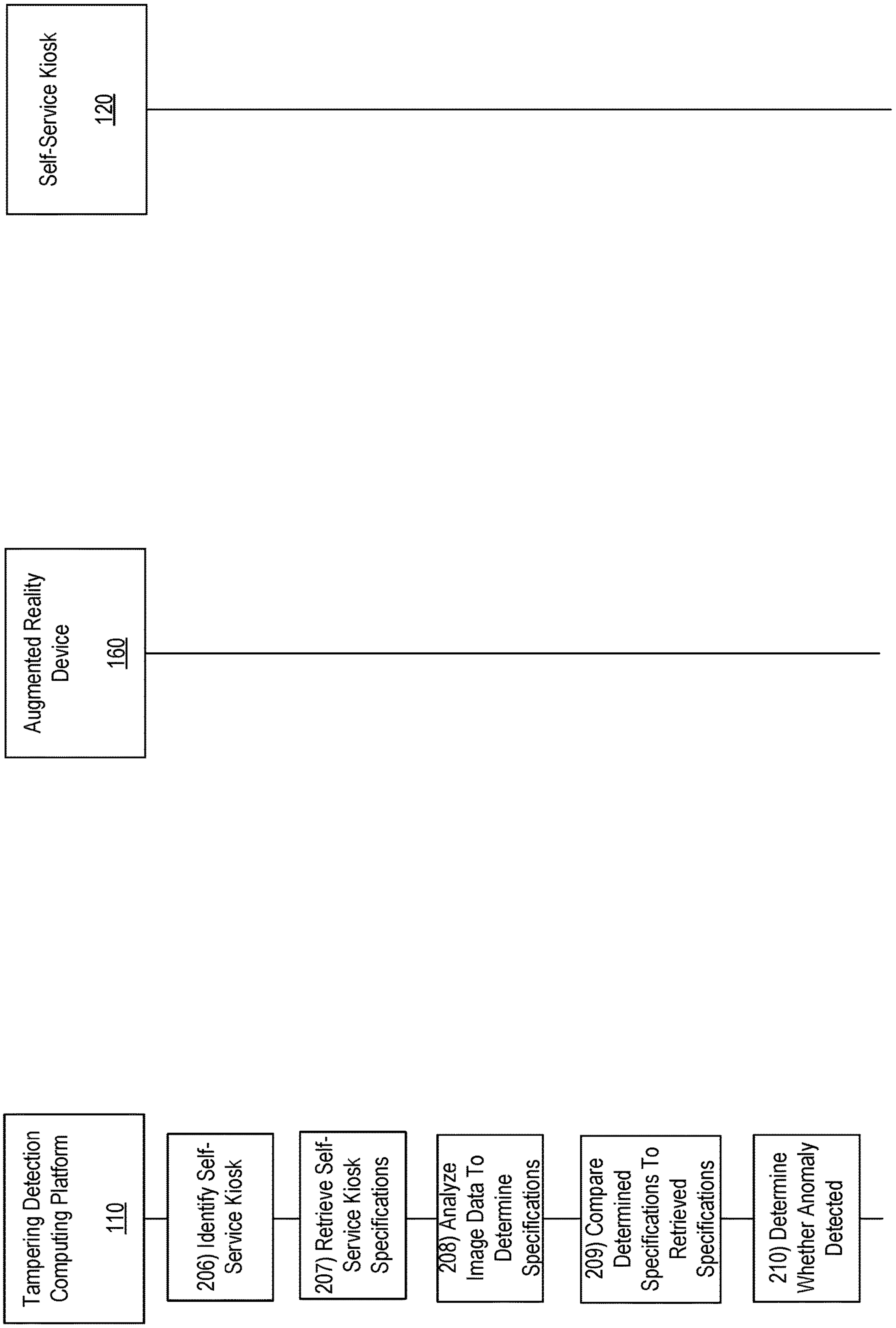
Figure 2C:
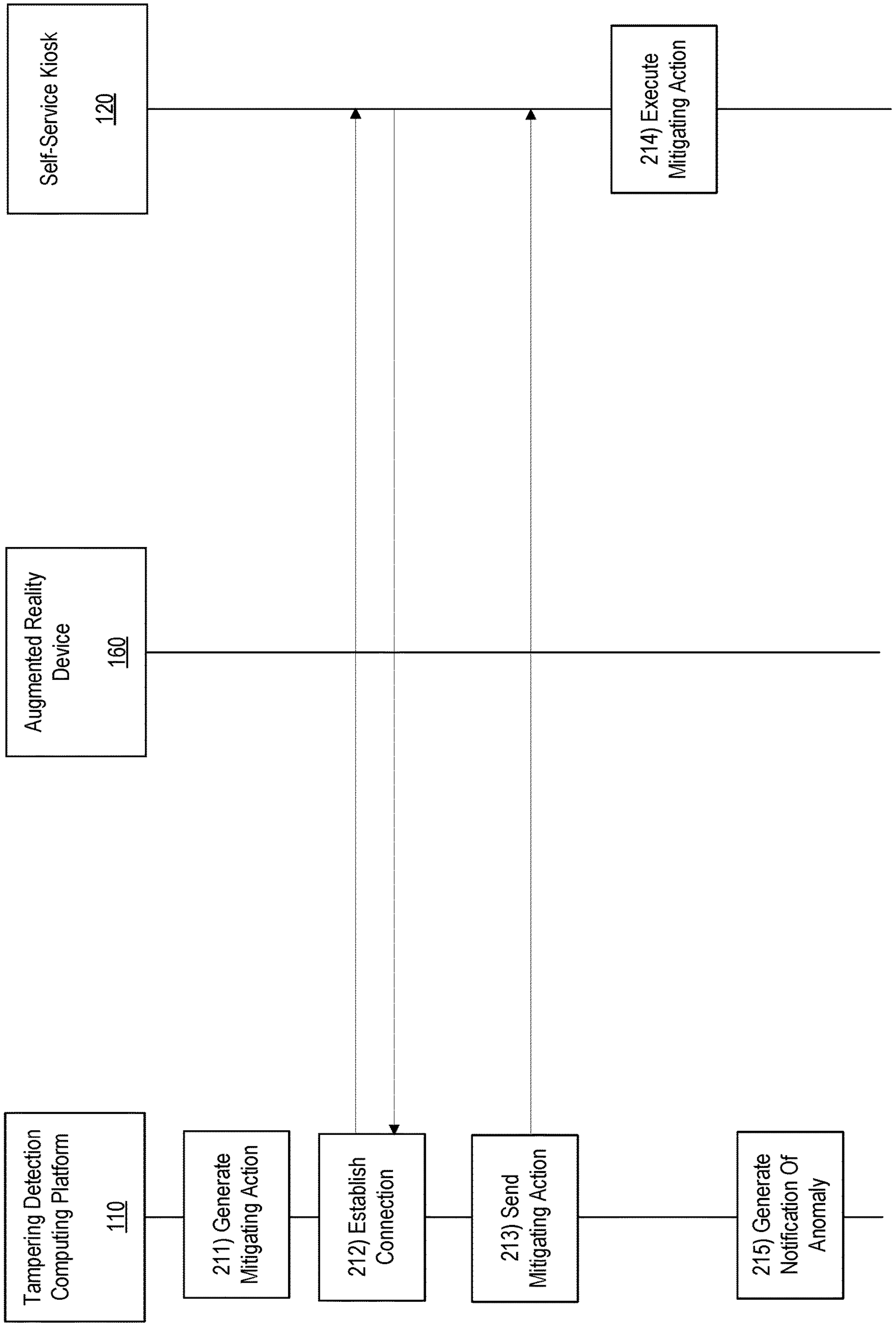

With reference to FIG. 2B, at step 206, tampering detection computing platform 110 may identify the self-service kiosk 120 from the received data. For instance, the tampering detection computing platform 110 may analyze the image data to determine (e.g., using optical character recognition, object recognition, or the like) a make, model or the like, of the self-service kiosk. Additionally or alternatively, tampering detection computing platform 110 may extract, from data received from the machine-readable code, identifying information of the self-service kiosk 120.

Based on the identified make, model, or the like, at step 207, tampering detection computing platform 110 may retrieve specifications for the identified make, model, or the like, of the self-service kiosk 120. For instance, tampering detection computing platform 110 may query database 112*e* using the make, model, or the like, as inputs, to retrieve physical specification data associated with the self-service kiosk 120. Additionally or alternatively, tampering detection computing platform 110 may parse data received from the machine-readable code to identify physical specifications of the self-service kiosk 120.

At step 208, tampering detection computing platform 110 may analyze the received image data to determine current or real-time specifications of the self-service kiosk 120. For instance, the image data may be analyzed (e.g., using object recognition, or the like) to determine one or more physical specifications of the self-service kiosk 120, such as overall dimensions, side of card reader slot, distance from card reader slot to surface of the self-service kiosk 120, depth of keypad relative to surface of the self-service kiosk 120, or the like).

At step 209, the determined current or real-time specifications may be compared to the retrieved specifications to detect any differences in the current specifications from the expected specifications retrieved from the pre-stored data.

At step 210, based on the comparing, a determination may be made as to whether any anomalies exist in the current specifications of the self-service kiosk 120. If an anomaly exists, the process may continue at step 211 in FIG. 2C. If an anomaly does not exist, the process may proceed to step 218 in FIG. 2D.

At step 211, tampering detection computing platform 110 may generate or identify a mitigating action. For instance, based on detection of an anomaly or discrepancy between the physical specifications determined from the received image data and the retrieved physical specifications of the self-service kiosk 120, tampering detection computing platform 110 may generate or identify one or more actions to mitigate risk associated with the detected anomaly. For instance, tampering detection computing platform 110 may identify or generate an action to modify functionality of the self-service kiosk 120 (e.g., if a card skimmer is detected, prevent use of card swipe to initiate transaction, shut down or prevent access to the self-service kiosk 120, or the like). Additionally or alternatively, an alert may be generated and transmitted to one or more administrative computing devices, service technicians, or the like. The alert may include an indication of the detected anomaly, identification of the self-service kiosk, and the like.

At step 212, tampering detection computing platform 110 may establish a connection with the self-service kiosk 120. For instance, a second wireless connection may be established between the tampering detection computing platform 110 and the self-service kiosk 120. Upon establishing the second wireless connection, a communication session may be initiated between the tampering detection computing platform 110 and the self-service kiosk 120.

At step 213, tampering detection computing platform 110 may send the generated or identified mitigating action to the self-service kiosk 120. For instance, the mitigating action may be transmitted or sent during the communication session initiated upon establishing the second wireless connection. In some examples, transmitting or sending the mitigating action may cause the self-service kiosk 120 to execute the mitigating action (e.g., modify functionality, display recommendation, or the like).

At step 214, self-service kiosk 120 may execute the mitigating action. Accordingly, self-service kiosk may modify functionality (e.g., disable card swipe to initiate transactions, or the like), display a recommendation or warning, shut down completely (e.g., prevent access to the self-service kiosk 120), or the like.

At step 215, tampering detection computing platform 110 may generate a notification indicating an anomaly was detected.

Figure 2D:
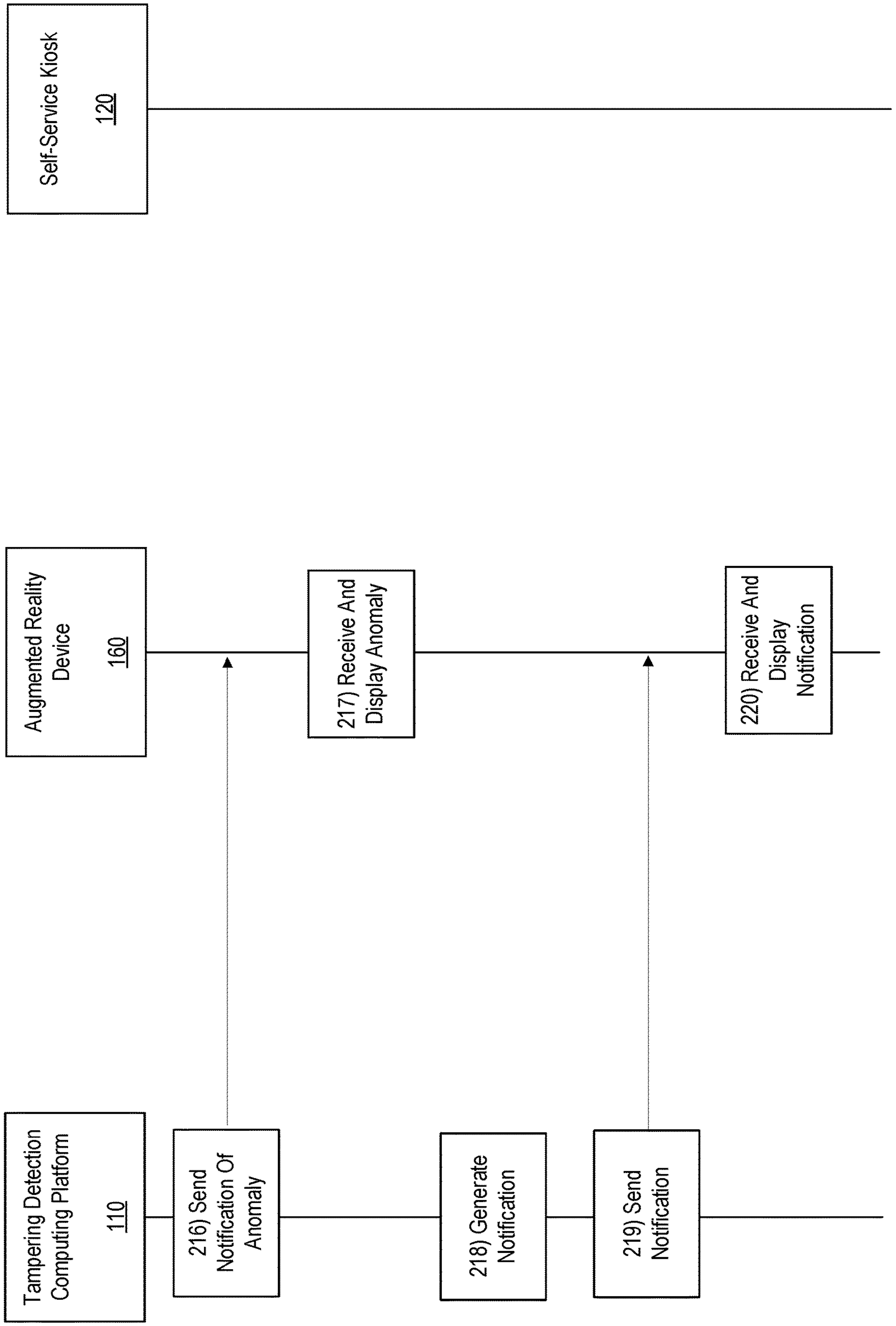

With reference to FIG. 2D, at step 216, tampering detection computing platform 110 may transmit or send the notification indicating the anomaly was detected to the augmented reality computing device 160. In some examples, transmitting or sending the notification may cause display of the notification or other indication (e.g., an augmented reality image indicating a location of the anomaly) on the augmented reality computing device 160.

Figure 4:
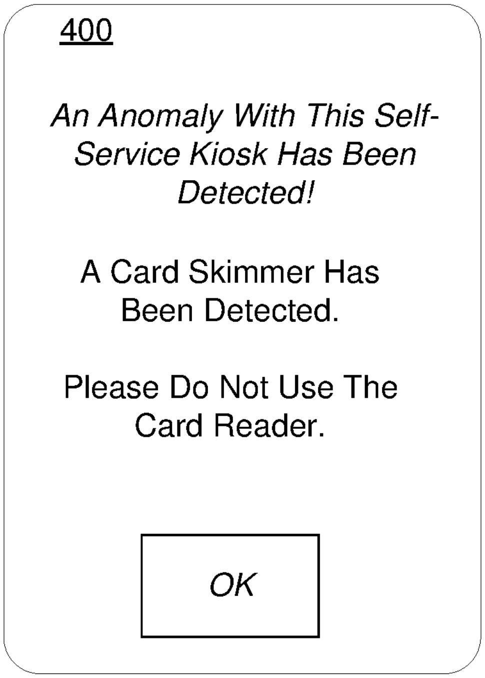
FIGS. 4-6 illustrate example notifications that may be generated in accordance with one or more aspects described herein.

At step 217, augmented reality computing device 160 may receive and display the notification or other indication of the anomaly. For instance, the augmented reality device may display a notification indicating that an anomaly was detected, where the anomaly was detected, or the like. FIG. 4 illustrates one example notification 400 that may be displayed on the augmented reality computing device 160. The notification 400 includes an indication of a type of anomaly (e.g., card skimmer detected) and a recommendation for the user to avoid using the card reader. Various other notifications may be generated without departing from the invention.

Figure 5:
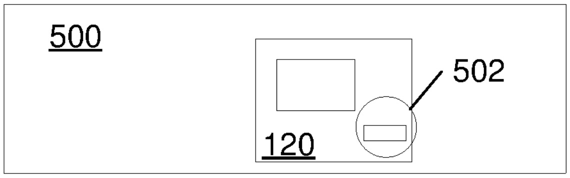

Additionally or alternatively, FIG. 5 illustrates another type of notification in which augmented reality is used to identify a location of the detected anomaly. FIG. 5 illustrates one example augmented reality view (e.g., via augmented reality glasses 500 for example) that indicates, at circle 502, where on the self-service kiosk 120 the anomaly was detected. Various other notifications or indications may be used without departing from the invention.

At step 218, if no anomaly has been detected, tampering detection computing platform 110 may generate a notification indicating that there is no anomaly.

At step 219, the tampering detection computing platform 110 may transmit or send the notification to the augmented reality computing device 160. In some examples, transmitting or sending the notification to the augmented reality computing device 160 may cause the augmented reality computing device 160 to display the notification.

Figure 6:
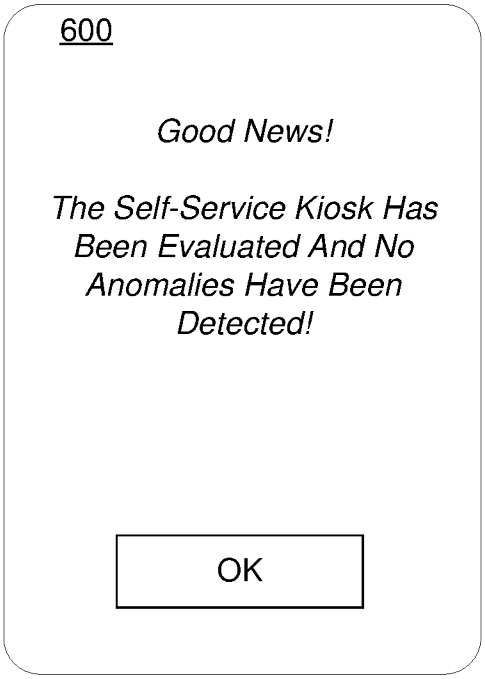

At step 220, the augmented reality computing device 160 may receive and display the generated notification. For instance, FIG. 6 includes one example notification 600 that may be generated by the tampering detection computing platform 110 and displayed by the augmented reality computing device 160. The notification 600 indicates that a tampering analysis has been performed and not anomalies have been detected.

Figure 3:
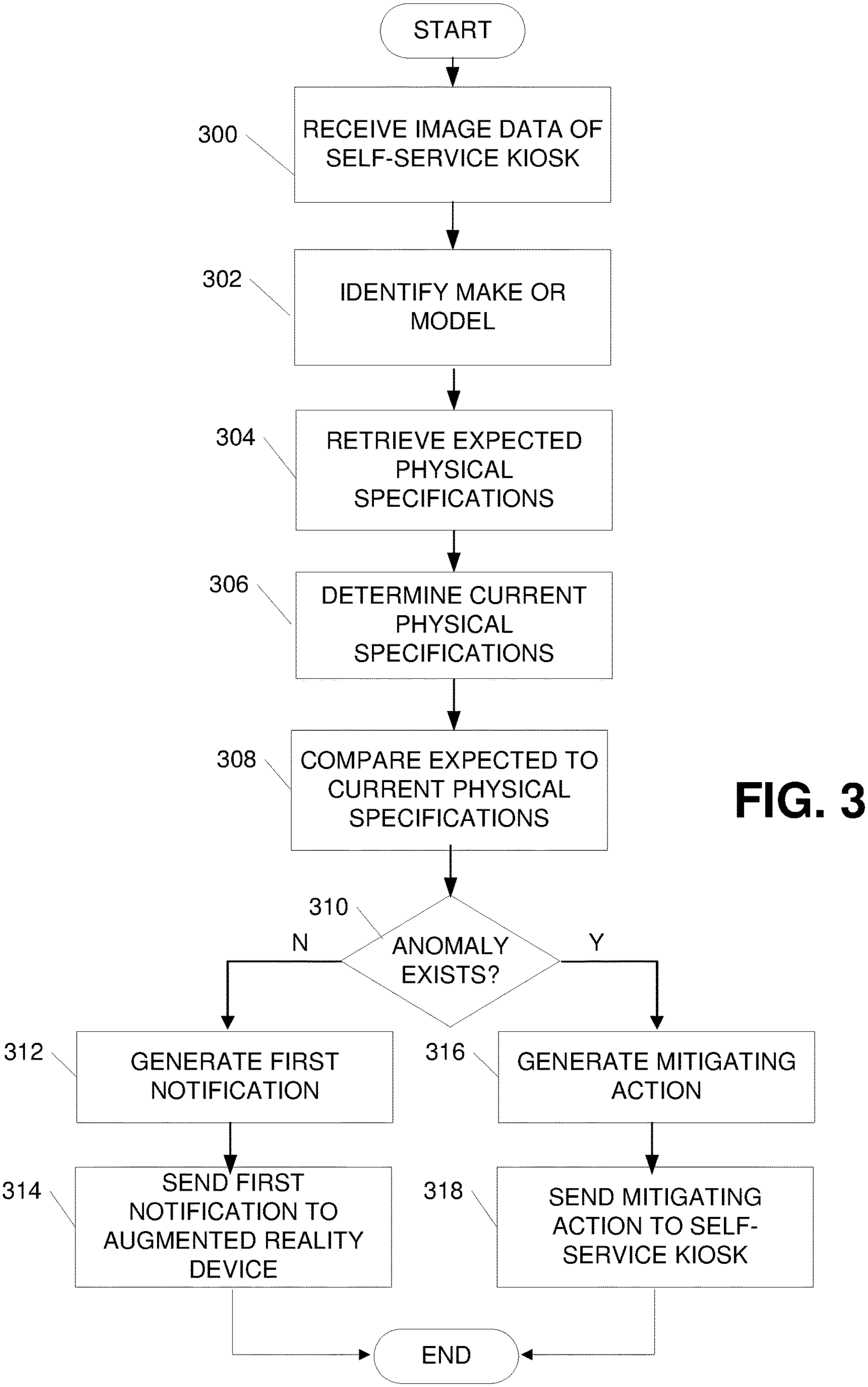
FIG. 3 depicts an illustrative method for implementing self-service kiosk tampering detection based on augmented reality in accordance with one or more aspects described herein.

FIG. 3 is a flow chart illustrating one example method of self-service kiosk tampering detection based on augmented reality in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may receive, from an augmented reality computing device, image data of a self-service kiosk. For instance, the augmented reality computing device may include an image capture device that may be used to capture image data (e.g., still images, video streams, or the like) of a self-service kiosk proximal to the augmented reality computing device.

At step 302, the received image data may be analyzed to identify at least one of a make or model of the self-service kiosk. For instance, identifying information, such as a make or model of the self-service kiosk may be extracted from the image data (e.g., using optical character recognition, object recognition, or the like).

At step 304, the identified make and/or model may be used to retrieve expected physical specifications of the self-service kiosk. For instance, the make and/or model may be used as inputs in a database query to retrieve pre-stored physical specification data of the self-service kiosk. The pre-stored physical specification data may include expected physical specifications of the self-service kiosk (e.g., based on manufacturer data, pre-commissioning data, or the like).

At step 306, the image data may be further analyzed to identify current physical specifications of the self-service kiosk. For instance, the images may be analyzed (e.g., using object recognition techniques) to determine current physical specifications of the self-service kiosk.

At step 308, the current physical specifications may be compared to the expected physical specifications to determine whether an anomaly exists.

At step 310, a determination may be made as to whether an anomaly exists. If not, at step 312, a first notification indicating that no anomaly exists may be generated. At step 314, the first notification may be transmitted to sent to the augmented reality computing device. In some examples, transmitting or sending the first notification may cause the augmented reality computing device to display the first notification.

If, at step 310, an anomaly does exist, at step 316, a mitigating action may be generated or identified. For instance, a mitigating action that may modify functionality of the self-service kiosk, render the self-service kiosk inaccessible to users, or the like, may be generated or identified.

At step 318, the mitigating action may be sent to the self-service kiosk. In some examples, sending the mitigating action may cause the self-service kiosk to execute the mitigating action.

In some examples, when it is determined that an anomaly exists (e.g., 310: YES), the computing platform may generate a second notification identifying the anomaly. In some examples, the second notification may be transmitted to the augmented reality computing device. In some arrangements, sending the second notification to the augmented reality computing device may cause the augmented reality computing device to display the second notification. In some arrangements, the second notification may include an augmented reality indication including an augmented reality indicator identifying a location of the anomaly on the self-service kiosk (e.g., an augmented reality indicator overlaying a view (e.g., image or view through lens of augmented reality glasses) of the self-service kiosk.

As discussed, aspects described herein provide tampering detection for self-service kiosks based on augmented reality. By capturing, in real-time or near real-time, current images of the self-service kiosk and determined, from the images, current physical specifications of the self-service kiosk, anomalies in the physical specifications may be detected and addressed promptly.

As discussed herein, the augmented reality aspects described may be provided via an application executing on the augmented reality computing device. For instance, the application may be provided by an enterprise organization associated with the self-service kiosk, such as a mobile banking application, or the like. The application may be configured to capture data, recognize data, and the like. Further, the application may be frequently updated to quickly and efficiently adapt to new technology or strategies being used by unauthorized users.

As discussed herein, by comparing the expected physical specifications of the self-service kiosk with the current physical specifications identified or determined from the image data, the system may detect anomalies in the current physical specifications of the self-service kiosk. For instance, if a card reader protrudes a few millimeters (e.g., 2 mm, 3 mm, 4 mm, or the like) from an expected position, the system may detect an anomaly (e.g., potential card skimmer attached to the card reader).

While aspects described herein are described in the context of a customer or user requesting tampering detection, the arrangements described herein may be used by service technicians, administrators, or the like, to identify tampering on the self-service kiosk, identify a location of an anomaly, execute removal of a skimming device (e.g., remove a card or keypad skimmer), or the like. In some examples, augmented reality may be used to guide the technician (or user) through areas of the self-service kiosk to evaluate for tampering.

As discussed herein, self-service kiosk identifying information may be extracted from the captured image data or may be retrieved using a machine-readable code displayed on the self-service kiosk. In some examples, the machine-readable code may be dynamically generated and displayed on a display screen upon user request (e.g., rather than hard printed on the self-service kiosk, which may be tampered with), as a user is detected near the self-service kiosk (e.g., via short range wireless communications), or the like. Accordingly, the user may scan the machine-readable code to obtain self-service kiosk identifying information, specification information, and the like. In some examples, specification information received based on the machine-readable code may be stored in the database for future user.

While several aspects described herein are directed to tampering via a card reader to keypad area of a self-service kiosk, in some examples, all areas of the self-service kiosk may be imaged and evaluated for tampering. For instance, a camera, display, and the like, may also be imaged and evaluated for potential tampering.

Further, as discussed herein, in some examples, information may be conveyed to the user by overlaying augmented reality indicators or elements over a view (e.g., an image or view through augmented reality glasses) of the self-service kiosk. As discussed, an overlay may include indications of potential tampering. Further, in some examples, the overlay may include instructions for operating the particular self-service kiosk (e.g., after capturing an identifier of the self-service kiosk). These arrangements may be used, in some examples, in regions where a user may speak a different language than the one presented on the self-service kiosk. Accordingly, the augmented reality overlays may include user prompts, instructions, or the like, in a preferred language of the user.

The augmented reality aspects described herein may also be used to project a virtual keypad that may be used instead of the keypad associated with the self-service kiosk (e.g., in case the keypad is compromised). For instance, the augmented reality device may connect to the self-service kiosk (e.g., via short range wireless communication protocols such as near field communication, Bluetooth™, or the like). The augmented reality device may the project a keypad onto, for instance, a touch screen display of the self-service kiosk (e.g., in arrangements in which the self-service kiosk includes a touch screen display in addition to a keypad that may be compromised). The user may then input a personal identification number or other authenticating data via the projected keypad on the touchscreen display, rather than using the potentially compromised keypad.

Additionally or alternatively, in arrangements in which the augmented reality device is a smart phone or similar device, the user may connect the augmented reality device to the self-service kiosk (e.g., via short range wireless communications) and the self-service kiosk may display, e.g., on a touchscreen display or other display, an image of twelve buttons available for selection. However, each button might not include a label. The augmented reality device may then display twelve buttons with each button including a label but in a non-traditional configuration. The user may select a number on the blank keypad on the self-service kiosk that corresponds to the desired number on the scrambled keypad on the augmented reality device. Accordingly, the user may select a desired digit but using a button in an unexpected or non-traditional position, which may reduce the likelihood of skimmers or unauthorized users capturing accurate data.

Figure 7:
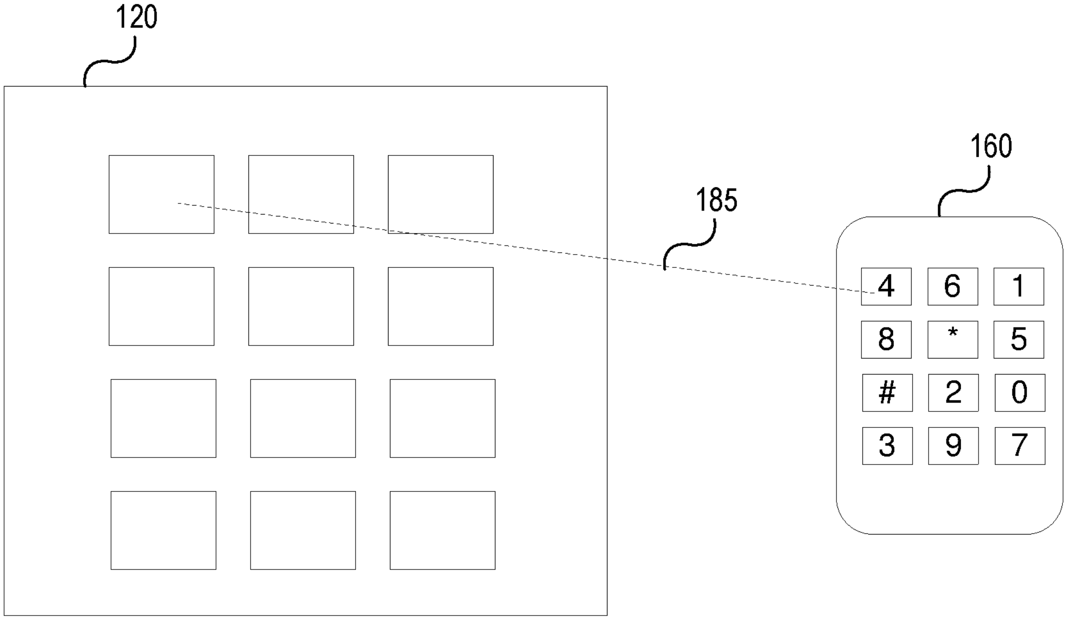
FIG. 7 illustrates one example augmented reality keypad arrangement in accordance with one or more aspects described herein.

FIG. 7 illustrates one example of this arrangement. As shown, the self-service kiosk 120 includes 12 unlabeled buttons while the augmented reality computing device 160 includes 12 labeled buttons but with labels in a non-traditional pattern. Accordingly, if the user desires to select the number "4," the user would select the unlabeled button in the upper left corner on the self-service kiosk 120 that corresponds to the button labeled "4" on the augmented reality computing device 160 (e.g., as indicated by broken line 185). The user may continue to select unlabeled buttons corresponding to the scrambled buttons until all desired data is input. Because the self-service kiosk 120 and augmented reality computing device 160 are connected and in communication, the self-service kiosk may interpret the unlabeled button selection as selection of the number on the corresponding scrambled keypad displayed on the augmented reality computing device 160.

Further, while aspects described herein are generally directed to users requesting tampering evaluation, in some examples, camera image data associated with the self-service kiosk may be used to continuously or on a periodic or aperiodic basis capture current image data of the self-service kiosk for tampering evaluation. For instance, a self-service kiosk may have a camera (e.g., a high-resolution camera) facing the self-service kiosk (e.g., in a lobby of a financial institution, or the like). The camera may continuously or periodically capture image data of the self-service kiosk that may then be evaluated using the arrangements described herein. Accordingly, the system may proactively evaluate a self-service kiosk for potential tampering without a user request. In some examples, the images may be time stamped and may be used to identify an unauthorized actor who tampered with the self-service kiosk.

In some examples, aspects described herein may be used to pre-stage one or more transactions at the self-service kiosk. For instance, a user may initiate a transaction via the application on the augmented reality device. Once the transaction is pre-staged, a confirmation code may be generated that may be input to the self-service kiosk to validate the user and complete the transaction (e.g., without requiring the user to input a physical card or PIN).

Figure 8:
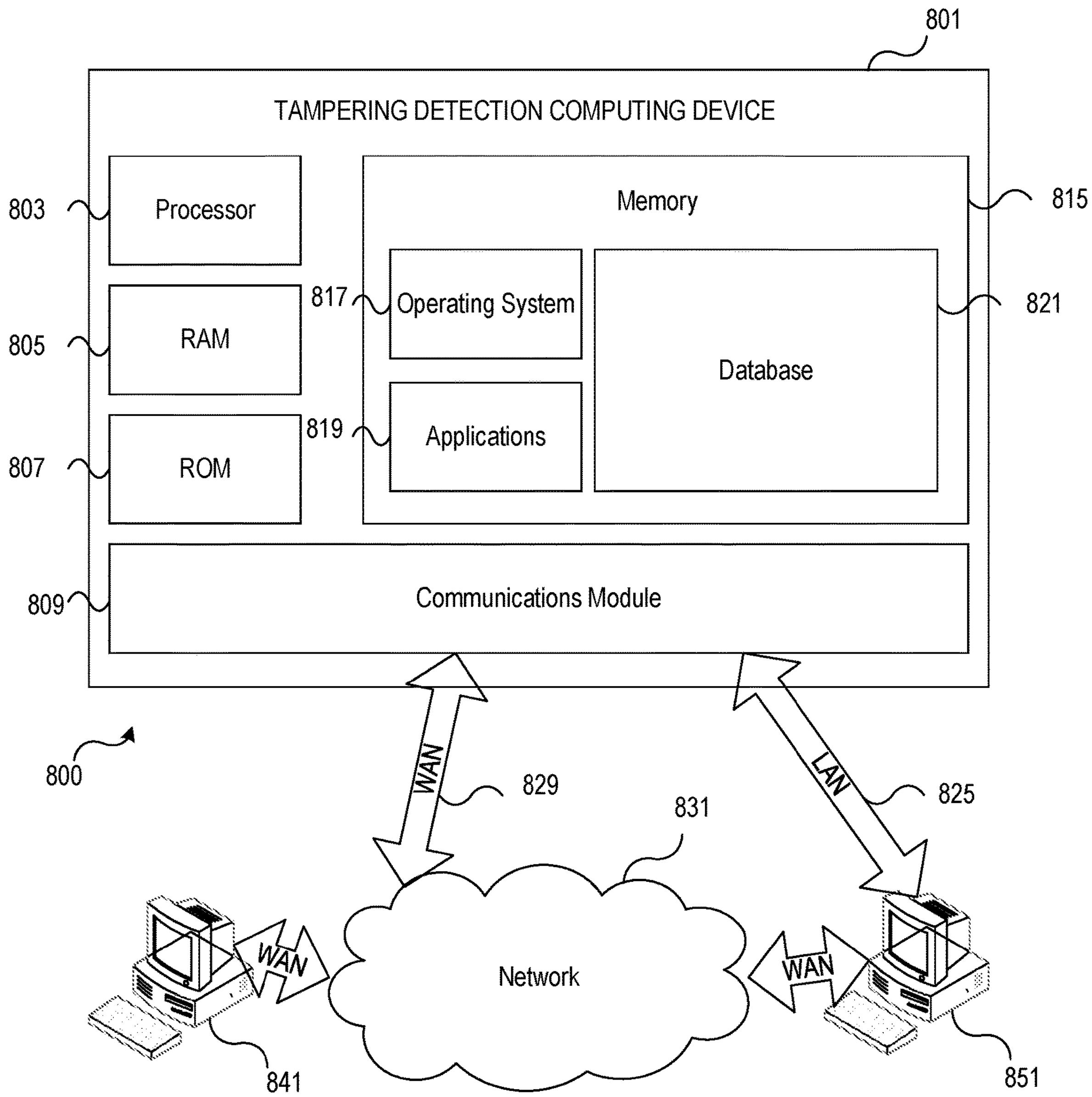
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include tampering detection computing device 801 having processor 803 for controlling overall operation of tampering detection computing device 801 and its associated components, including Random Access Memory (RAM) 805, Read-Only Memory (ROM) 807, communications module 809, and memory 815. Tampering detection computing device 801 may include a variety of computer readable media. Computer readable media may be any available media that may be accessed by tampering detection computing device 801, may be non-transitory, and may include volatile and non-volatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by tampering detection computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on tampering detection computing device 801. Such a processor may execute computer-executable instructions stored on a computer-readable medium.

Software may be stored within memory 815 and/or storage to provide instructions to processor 803 for enabling tampering detection computing device 801 to perform various functions as discussed herein. For example, memory 815 may store software used by tampering detection computing device 801, such as operating system 817, application programs 819, and associated database 821. Also, some or all of the computer executable instructions for tampering detection computing device 801 may be embodied in hardware or firmware. Although not shown, RAM 805 may include one or more applications representing the application data stored in RAM 805 while tampering detection computing device 801 is on and corresponding software applications (e.g., software tasks) are running on tampering detection computing device 801.

Communications module 809 may include a microphone, keypad, touch screen, and/or stylus through which a user of tampering detection computing device 801 may provide input, and may also include one or more of a speaker for providing audio output and a video display device for providing textual, audiovisual and/or graphical output. Computing system environment 800 may also include optical scanners (not shown).

Tampering detection computing device 801 may operate in a networked environment supporting connections to one or more other computing devices, such as computing device 841 and 851. Computing devices 841 and 851 may be personal computing devices or servers that include any or all of the elements described above relative to tampering detection computing device 801.

The network connections depicted in FIG. 8 may include Local Area Network (LAN) 825 and Wide Area Network (WAN) 829, as well as other networks. When used in a LAN networking environment, tampering detection computing device 801 may be connected to LAN 825 through a network interface or adapter in communications module 809. When used in a WAN networking environment, tampering detection computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive, from an augmented reality computing device, image data of a self-service kiosk, wherein the image data includes a dynamically generated machine-readable code displayed on a display of the self-service kiosk and displayed in response to detection of a user within a predefined range of the self-service kiosk;

analyze the received image data and machine-readable code;

identify, based on analyzing at least the machine-readable code, at least one of: a make or model of the self-service kiosk;

retrieve, based on the at least one of the make or mode of the self-service kiosk, expected physical specifications of the self-service kiosk;

further analyze the received image data to determine current physical specifications of the self-service kiosk;

compare the retrieved expected physical specifications of the self-service kiosk to the determined current physical specifications of the self-service kiosk to determine whether an anomaly exists;

responsive to determining, based on the comparing, that an anomaly exists:

determine that the anomaly exists in a keypad of the self-service kiosk;

generate a mitigating action; and send the mitigating action to the self-service kiosk and the augmented reality computing device, wherein sending the mitigating action to the self-service kiosk and the augmented reality computing device causes the self-service kiosk and the augmented reality computing device to execute the mitigating action and wherein the executing the mitigating action by the augmented reality computing device includes projecting, onto a touchscreen of the self-service kiosk, a keypad for receiving user input by the self-service kiosk to avoid user input via the keypad having the anomaly; and responsive to determining, based on the comparing, that an anomaly does not exist:

generate a first notification indicating that an anomaly does not exist; and send the first notification to the augmented reality computing device, wherein sending the first notification to the augmented reality computing device causes the augmented reality computing device to display the first notification.

2. The computing platform of claim 1, further including instructions that, when executed, cause the computing platform to:

responsive to determining, based on the comparing, that an anomaly exists:

generate a second notification identifying the anomaly; and send the second notification to the augmented reality computing device, wherein sending the second notification to the augmented reality computing device causes the augmented reality computing device to display the second notification.

3. The computing platform of claim 2, wherein the second notification includes an augmented reality indication identifying a location of the anomaly on the self-service kiosk.

4. The computing platform of claim 3, wherein the augmented reality indication identifying the location of the anomaly on the self-service kiosk includes an augmented reality indicator overlaying a view of the self-service kiosk.

5. The computing platform of claim 4, wherein the augmented reality computing device includes augmented reality glasses.

6. The computing platform of claim 1, wherein the augmented reality computing device is located proximal to the self-service kiosk.

7. The computing platform of claim 1, wherein the augmented reality computing device includes an image capture device configured to capture the image data of the self-service kiosk.

8. The computing platform of claim 1, wherein the mitigating action includes at least one of: modifying operation of the self-service kiosk or disabling access to the self-service kiosk.

9. A method, comprising:

receiving, by a computing platform, the computing platform having at least one processor and memory, and from an augmented reality computing device, image data of a self-service kiosk, wherein the image data includes a dynamically generated machine-readable code displayed on a display of the self-service kiosk and displayed in response to detection of a user within a predefined range of the self-service kiosk;

analyzing, by the at least one processor, the received image data and machine-readable code;

identifying, based on analyzing at least the machine-readable code, at least one of: a make or model of the self-service kiosk;

retrieving, by the at least one processor and based on the at least one of the make or mode of the self-service kiosk, expected physical specifications of the self-service kiosk;

further analyzing, by the at least one processor, the received image data to determine current physical specifications of the self-service kiosk;

comparing, by the at least one processor, the retrieved expected physical specifications of the self-service kiosk to the determined current physical specifications of the self-service kiosk to determine whether an anomaly exists;

responsive to determining, based on the comparing, that an anomaly exists:

determining, by the at least one processor, that the anomaly exists in a keypad of the self-service kiosk;

generating, by the at least one processor, a mitigating action; and sending, by the at least one processor, the mitigating action to the self-service kiosk and the augmented reality computing device, wherein sending the mitigating action to the self-service kiosk and the augmented reality computing device causes the self-service kiosk and the augmented reality computing device to execute the mitigating action, and wherein the executing the mitigating action by the augmented reality computing device includes projecting, onto a touchscreen of the self-service kiosk, a keypad for receiving user input by the self-service kiosk to avoid user input via the keypad having the anomaly; and responsive to determining, based on the comparing, that an anomaly does not exist:

generating, by the at least one processor, a first notification indicating that an anomaly does not exist; and sending, by the at least one processor, the first notification to the augmented reality computing device, wherein sending the first notification to the augmented reality computing device causes the augmented reality computing device to display the first notification.

10. The method of claim 9, further including:

responsive to determining, based on the comparing, that an anomaly exists:

generating, by the at least one processor, a second notification identifying the anomaly; and sending, by the at least one processor, the second notification to the augmented reality computing device, wherein sending the second notification to the augmented reality computing device causes the augmented reality computing device to display the second notification.

11. The method of claim 10, wherein the second notification includes an augmented reality indication identifying a location of the anomaly on the self-service kiosk.

12. The method of claim 11, wherein the augmented reality indication identifying the location of the anomaly on the self-service kiosk includes an augmented reality indicator overlaying a view of the self-service kiosk.

13. The method of claim 12, wherein the augmented reality computing device includes augmented reality glasses.

14. The method of claim 9, wherein the augmented reality computing device includes an image capture device configured to capture the image data of the self-service kiosk.

15. The method of claim 9, wherein the mitigating action includes at least one of: modifying operation of the self-service kiosk or disabling access to the self-service kiosk.

16. One or more non-transitory computer-readable media storing instructions that, when executed by a computing platform comprising at least one processor, memory, and a communication interface, cause the computing platform to:

receive, from an augmented reality computing device, image data of a self-service kiosk, wherein the image data includes a dynamically generated machine-readable code displayed on a display of the self-service kiosk and displayed in response to detection of a user within a predefined range of the self-service kiosk;

analyze the received image data and machine-readable code;

identify, based on analyzing at least the machine-readable code, at least one of: a make or model of the self-service kiosk;

retrieve, based on the at least one of the make or mode of the self-service kiosk, expected physical specifications of the self-service kiosk;

further analyze the received image data to determine current physical specifications of the self-service kiosk;

compare the retrieved expected physical specifications of the self-service kiosk to the determined current physical specifications of the self-service kiosk to determine whether an anomaly exists;

responsive to determining, based on the comparing, that an anomaly exists:

determine that the anomaly exists in a keypad of the self-service kiosk;

generate a mitigating action; and send the mitigating action to the self-service kiosk, and the augmented reality computing device, wherein sending the mitigating action to the self-service kiosk and the augmented reality computing device causes the self-service kiosk and the augmented reality computing device to execute the mitigating action, and wherein the executing the mitigating action by the augmented reality computing device includes projecting, onto a touchscreen of the self-service kiosk, a keypad for receiving user input by the self-service kiosk to avoid user input via the keypad having the anomaly; and responsive to determining, based on the comparing, that an anomaly does not exist:

generate a first notification indicating that an anomaly does not exist; and send the first notification to the augmented reality computing device, wherein sending the first notification to the augmented reality computing device causes the augmented reality computing device to display the first notification.

17. The one or more non-transitory computer-readable media of claim 16, further including instructions that, when executed, cause the computing platform to:

responsive to determining, based on the comparing, that an anomaly exists:

generate a second notification identifying the anomaly; and send the second notification to the augmented reality computing device, wherein sending the second notification to the augmented reality computing device causes the augmented reality computing device to display the second notification.

18. The one or more non-transitory computer-readable media of claim 17, wherein the second notification includes an augmented reality indication identifying a location of the anomaly on the self-service kiosk, and wherein the augmented reality indication identifying the location of the anomaly on the self-service kiosk includes an augmented reality indicator overlaying a view of the self-service kiosk.

19. The one or more non-transitory computer-readable media of claim 18, wherein the augmented reality computing device includes augmented reality glasses.

20. The computing platform of claim 1, wherein the projected keypad includes an image of twelve buttons without labels and wherein executing the mitigation action by the augmented reality device further includes displaying, on the augmented reality computing device, twelve buttons having labels, wherein selection of a button on the projected keypad includes selection of a label on a corresponding button displayed on the augmented reality computing device.

* * * * *